April 19, 1960    P. KREIS    2,933,283
CUT-OFF VALVE
Filed Feb. 14, 1958
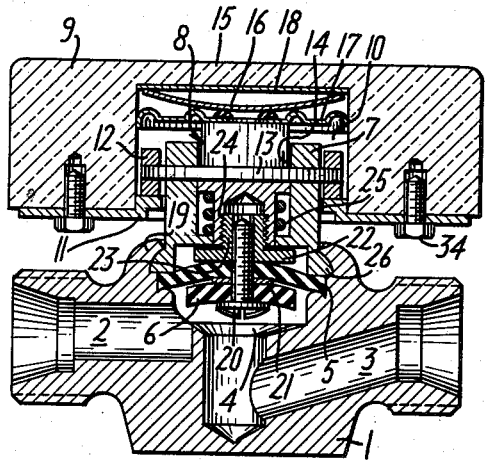
FIG. 1
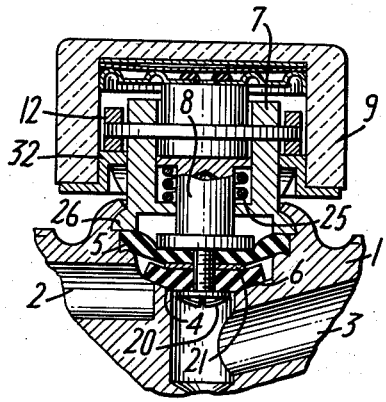
FIG. 2
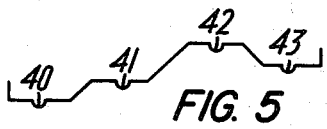
FIG. 5
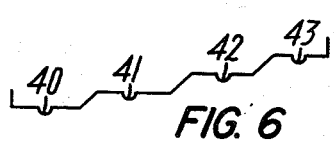
FIG. 6
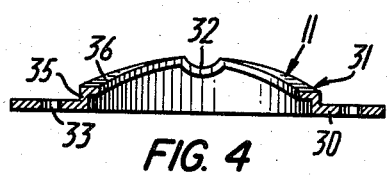
FIG. 4
FIG. 3
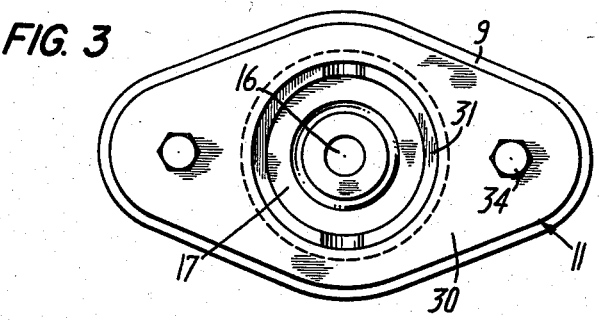

United States Patent Office 2,933,283
Patented Apr. 19, 1960

2,933,283
CUT-OFF VALVE

Philipp Kreis, Munich, Germany

Application February 14, 1958, Serial No. 715,227

Claims priority, application Switzerland October 19, 1957

7 Claims. (Cl. 251—77)

The invention relates to a stop or cut-off valve of the type of membrane or diaphragm valves for gaseous and liquid media especially to a high-speed, rapid-closing valve having a rotary handle causing a displacement of the valve tappet when rotated.

The known valves are actuated either by a screw-down spindle or by a bayonet catch. Both types have disadvantages.

It is the object of the invention to create an improved and simplified stop valve, whose special advantages mainly resides in its absolute safety and the simplicity of its operation.

The invention provides for a stop valve for liquid or gaseous media, especially a membrane or slide valve, the rotary handle of which causes an axial displacement of the valve tappet. The invention is substantially characterized in that the rotary knob tensionally connected to the valve tappet is provided with a control element which engages with stationary sliding elements.

According to a preferred embodiment of the invention, the valve tappet is coaxially guided in a valve cover fixed in the valve body perpendicularly to the path of flow, and the rotatable knob carrying the control member has a cylindrical opening overlapping the valve cover, the control member being arranged on the superficies of said opening.

According to a preferred embodiment, the control member is a circular endless or finite curved path having at least one valley and peak corresponding to the control position of the valve.

An embodiment of a high-speed, rapid-closing valve according to the invention is shown in the accompanying drawings, in which:

Fig. 1 is a longitudinal section through an open valve;
Fig. 2 is a longitudinal section through a closed valve;
Fig. 3 is a bottom view of a rotary knob with built-in control member;
Fig. 4 is a cross section through the center of a control member;
Fig. 5 is a developed view of a control-member curve; and
Fig. 6 is another development of another control-member curve.

The membrane or diaphragm valve shown in Fig. 1 consists of a valve body 1 with flow borings 2 and 3, a valve seat 4, an elastic spring diaphragm 5 with a packing disc 6 and a valve tappet 8 which actuates the diaphragm and is guided in a valve cover or bonnet 7. The valve tappet is operated by a rotary knob 9 which is radially rotatable but not axially displaceable with respect to the valve tappet. The rotary knob and the valve tappet are tensionally connected and thus execute the same axial displacements when the valve is operated. In order to produce the required motion of the rotary knob and the tappet, a control member 11 is built into an appropriately dimensioned opening 10 of the knob or handle. The invention also provides for a transverse shaft 13 passing diametrically through the valve cover 7 and having at its ends the rollers 12 which tensionally cooperate with the control member. Since the height of this transverse shaft in the cover is fixed by means of accurately fitted borings, the rotary knob when rotated effects an axial displacement corresponding to the curved path of the control member. The rotary knob cap 15 then transmits this axial displacement to the tappet which, in the embodiment, is kept freely moving with respect to the transverse shaft by means of an appropriately dimensioned groove 14 or slot in the tappet. In the example, the groove extends to the upper end of the tappet. A spring disc or elastic washer 16 may be interposed between the tappet and the rotary-knob cap 15. The tappet head carries a cover plate 17 provided with pressed-in rings. A disc 18 may be inserted between the spring disc and the rotary-knob cap. The spring disc acts in the sense of closing the valve. The path of the spring is short; it acts as elasticity reserve for compensating the elasticity of the packing disc 6 in the closing position. The metallic spring disc may be replaced by any other elastic member such as spiral spring, rubber pad or the like.

According to Figs. 1 and 2, the valve cover is pressed into the valve body 1, which displays at this point an opening 26. For this purpose, compressed flanges overlap the base of the cover. This compression, which may, of course, also be produced by means of a screw fastening, simultaneously serves to press in the diaphragm 5 as well. The diaphragm is perforated in the center to permit the neck of the tappet to pass through. The packing disc 6 is mounted on said neck as is an additional closure disc 21, designed to increase support and durability, between the flexible diaphragm and the packing disc. These members are held in position by a head-like end of the tappet neck, for instance, a screw 20 or a rivet pin. On the opposite side of the diaphragm, the tappet comprises a stop disc 22, which, on the one hand, joins the diaphragm and, on the other, strikes against the bottom of the valve cover when the valve is open.

The tappet 8 consists of two members. One portion, the diaphragm carrier, is formed of a stop disc 22 and a threaded bolt 23. The other portion, the rotary-knob carrier, consists of a cylindrical guide piece with the groove 14 and a threaded sleeve 24 offset for this purpose. The threaded bolt is fitted accurately into the threaded sleeve whereby a screw fastening of the two portions is produced. The screw fastening offers the advantage of a certain adjustability of the tappet for compensating manufacturing tolerances. This screw fastening is secured against being twisted from the adjusted position by the transverse shaft. A spiral spring 25 is supported by the upper tappet portion on the one side and by the bottom of the cover on the other, thereby producing spring action in the sense of opening the valve.

The control member 11 may consist of oppositely situated guide grooves in the rotary knob for the slide rollers. It is sufficient for this purpose if the grooves have a length which suffices for effecting the rotation required to actuate the valve. According to one of the preferred embodiments of the invention, the control element is formed of a single stamped structural element (Figs. 3 and 4) and consists of a holding flange 30 and a circular, uninterrupted curved path 31. Owing to transverse shaft engaging the curved path on both sides, the latter has two symmetrically arranged valleys and peaks. The peaks, which correspond to the closing position of the valve, are provided with a depression 32 designed to prevent the transverse shaft being automatically urged away from this position. The round reversal on this embodiment is made possible by the fact that the curved path does not end with an extreme corresponding to a valve position, but that it continues with a pattern which is identical with curve located ahead of the extreme. Such a symmetrically shaped curve pattern permits of a rounded reversal not only in one but in every direction of rotation.

Although this embodiment shows a bilaterally symmetrical control curve, the invention is not limited thereto. The round reversal is, of course, also possible in the case of only one or several peaks and valleys on a circumference. The invention may also be realized with a guiding member having a lower embodiment and an upper curved path (not shown in the drawing). Depending on the construction, especially on the spring load of the valve to be controlled, it is, of course, possible to provide only for an upper curved path, i.e., a curved control path having its effective path area in the direction of the valve seat. In this case, it would be of special advantage to mold the curved path into the rotary knob when same is manufactured. The holding flange 30 of the control member is advisably shaped to correspond to the shape of the rotary knob. The two ends of said flange are provided with borings 33 for being fastened to the rotary knob, for instance by means of the cap screws 34. In the embodiment, the curved path 31 is pressed out of the holding flange. A flange 35 with a horizontal gliding plane 36 may be formed. This shape is quite strong structurally and makes it possible to form a sufficiently wide curved gliding plane of a thin metal plate. The control member may, of course, also be made in a different manner, for example, as a pressed or molded member with wide, full curved flange, or as a casting. The depressions or valleys of the curve may be positioned at any other angle to the flange, depending on the arrangement of the transverse shaft. It is advantageous to arranged the peaks close to the fastening screws, since this arrangement facilitates the absorbing of the increased load in the closing position of the valve (the embodiment shows the opposite arrangement for diagrammatic reasons). Finally the control member may, of course, consist of several portions.

Contrary to the above-described endless control curves, the control member may, according to another embodiment, constitute a finite curved path. Figs. 5 and 6 illustrate examples of such curve developments. The positions 40, 41, 42 and 43 are end and intermediate positions; but they may also be assigned to special valve operating processes.

The rotary knob 9 is preferably made of plastic or metal casting. Its shape according to the invention is rhombic or elliptical (Fig. 3). This shaping of the knob facilitates the adjustment of the valve and makes it possible to grip it even in the dark. Logically, the longitudinal axis of the rotary knob, when open, extends in the direction of flow, and perpendicularly thereto when the knob is closed. Accordingly, the control curves are advisably disposed in such a manner that full action pitch of the tappet is obtained when the rotary knob is rotated by 90°.

The embodiments of an invention in which an exclusive property or privilege is claimed are defined as follows:

1. In a valve, a valve body having an intake opening and discharge opening, a cover on said body and a valve seat provided with an opening for placing the inlet and outlet openings in communication when said seat opening is open, a valve member operable between a seated position on said valve seat closing the seat opening and a plurality of unseated positions corresponding to positions partially and fully opening the valve, an axially displaceable tappet for operating the valve to the seated and unseated positions, mechanism for actuating the valve to open and closed positions comprising, a rotatable member mounted for rotational movement and axial movement on said cover, first resilient means cooperative with said rotatable member for biasing the tappet in an axial direction toward a position for seating the valve member, second resilient means biasing the tappet in an opposite axial direction for unseating the valve, means comprising a control cam plate rotatable under control of the rotatable member for displacing the rotatable member on the valve cover in opposite axial directions corresponding to the opposite directions of axial displacement of said tappet by the first and second resilient means, said cam plate having a cam portion for displacing the rotatable member axially on said cover in a direction for compressing the first resilient means to cause it to move the tappet axially in a direction overcoming the second resilient means and seating the valve member and for moving the rotatable member axially in selected increments away from the axial position thereof correponding to the position in which the valve is closed thereby to open the valve.

2. In a valve, a valve body having an intake opening and discharge opening, a cover on said body and a valve seat provided with an opening for placing the inlet and outlet openings in communication when said seat opening is open, a valve member operable between a seated position on said valve seat closing the seat opening and a plurality of unseated positions corresponding to positions partially and fully opening the valve, an axially displaceable tappet for operating the valve to the seated and unseated positions, mechanism for actuating the valve to open and closed positions comprising, a knob mounted for rotational movement and axial movement on said cover, first resilient means cooperative with said knob for biasing the tappet in an axial direction toward a position for seating the valve member, second resilient means biasing the tappet in an opposite axial direction for unseating the valve, means comprising a control cam plate mounted on the knob for displacing the rotatable member on the valve cover in opposite axial directions corresponding to the opposite directions of axial displacement of said tappet by the first and second resilient means, said cam plate having a cam portion for displacing the knob axially on said cover in a direction for compressing the first resilient means to cause it to move the tappet axially in a direction overcoming the second resilient means and seating the valve member and for moving the rotatable member axially in selected increments away from the axial position thereof corresponding to the position in which the valve is closed thereby to open the valve.

3. In a valve according to claim 2 in which, said cover is tubular and the tappet is mounted axially guided therein and in which, said means for displacing the knob axially on the cover comprises cam followers rotatably mounted on said cover and cooperative with said cam portion of the cam plate, said first resilient means being disposed bearing against said tappet and said second resilient means being disposed holding the tappet against said first resilient means, said knob having a recess housing said first resilient means and said cover extending into said recess.

4. In a valve, a valve body having an intake opening, a discharge opening and a valve seat provided with an opening for placing the inlet and outlet openings in communication when said seat opening is open, a cover on said body, means for opening and closing the valve at will comprising a resilient, deformable valve member operable between a seated position on said valve seat closing the seat opening and an unseated position opening the valve and having the characteristic of constantly tending to restore itself to the unseated position, a cover including a tubular bonnet disposed extending outwardly of the valve body and into it clamping a marginal edge portion of said valve member to hold the marginal edge portion in a fluid-tight fixed position relative the valve body, an axially displaceable tappet disposed in said tubular bonnet operably connected to the valve body for operating the valve member to the seated and unseated positions and constantly urged by said valve member axially toward a valve opening direction; a rotatable knob member on said bonnet operatively coupled to the tappet and having a control cam plate rotatable therewith disposed peripherally of the bonnet, cam follower means internally of the knob connected to said bonnet bearing on the cam plate for causing the knob member to move axially of the bonnet thereby to displace the tappet axially in opposite directions, said cam plate having a ramp construction for controlling the axial displacement of said tappet and operative valve-opening and valve-closing positions of the tappet, and the direction in which said diaphragm urges said tappet corresponding to a direction for causing the cam plate to bear on said cam follower means.

5. In a valve according to claim 4, in which said cam plate has a ramp construction configured to define a plurality of operative positions of the tappet between the valve-closing position and a fully-opened position of the valve.

6. In a valve according to claim 4 in which said cam plate has an uninterrupted ramp construction with two symmetrically arranged peak portions and two symmetrically arranged lowermost portions with the rate of ascent between each corresponding lowermost portion and a corresponding peak being equal.

7. In a valve according to claim 4, in which the cam plate is formed as a circular ramp uninterrupted path with a lowermost portion and an uppermost portion corresponding to the valve-opening position and the valve-closing positions respectively of the tappet.

References Cited in the file of this patent

UNITED STATES PATENTS

| | | |
|---|---|---|
| 1,286,286 | Glauber | Dec. 3, 1918 |
| 1,425,412 | Norwood | Aug. 8, 1922 |
| 1,589,696 | Holtz | June 22, 1926 |
| 2,500,397 | Bauerlein | Mar. 14, 1950 |
| 2,850,034 | Svabek | Sept. 2, 1958 |

FOREIGN PATENTS

| | | |
|---|---|---|
| 144,524 | Australia | of 1952 |
| 472,377 | Italy | of 1952 |